(12) United States Patent
Kawamura

(10) Patent No.: US 10,747,079 B2
(45) Date of Patent: Aug. 18, 2020

(54) LIQUID CRYSTAL DISPLAY DEVICE

(71) Applicant: Panasonic Liquid Crystal Display Co., Ltd., Himeji-shi, Hyogo (JP)

(72) Inventor: Tetsuya Kawamura, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 16/280,770

(22) Filed: Feb. 20, 2019

(65) Prior Publication Data

US 2019/0265561 A1 Aug. 29, 2019

(30) Foreign Application Priority Data

Feb. 23, 2018 (JP) .................................. 2018-030565

(51) Int. Cl.
| | |
|---|---|
| *G02F 1/1362* | (2006.01) |
| *G02F 1/1343* | (2006.01) |
| *G02F 1/137* | (2006.01) |
| *G02F 1/1368* | (2006.01) |
| *G02F 1/1337* | (2006.01) |
| *G02F 1/1335* | (2006.01) |

(52) U.S. Cl.
CPC ........ *G02F 1/136286* (2013.01); *G02F 1/137* (2013.01); *G02F 1/1368* (2013.01); *G02F 1/134336* (2013.01); *G02F 1/134363* (2013.01); *G02F 1/1337* (2013.01); *G02F 1/133514* (2013.01); *G02F 2001/13706* (2013.01); *G02F 2001/133738* (2013.01); *G02F 2201/122* (2013.01); *G02F 2201/123* (2013.01); *G02F 2201/40* (2013.01)

(58) Field of Classification Search
CPC .. G02F 1/137; G02F 1/1337; G02F 1/134336; G02F 1/134363; G02F 1/136286
See application file for complete search history.

(56) References Cited

U.S. PATENT DOCUMENTS

| | | | |
|---|---|---|---|
| 2008/0180622 A1 | 7/2008 | Horiguchi et al. | |
| 2012/0307172 A1* | 12/2012 | Yoshida | ............ G02F 1/133707 349/139 |
| 2014/0168553 A1 | 6/2014 | Park et al. | |
| 2015/0177579 A1* | 6/2015 | Lim | .................. G02F 1/134336 345/90 |

(Continued)

FOREIGN PATENT DOCUMENTS

| | | |
|---|---|---|
| JP | 2008-180928 | 8/2008 |
| JP | 5745601 B | 7/2015 |

*Primary Examiner* — Dung T Nguyen
(74) *Attorney, Agent, or Firm* — Hamre, Schumann, Mueller & Larson, P.C.

(57) ABSTRACT

A liquid crystal display device comprises: a first data line extending in a first direction; a first pixel electrode and a second pixel electrode that are arranged in the first direction; a first transistor connected to the first pixel electrode; a second transistor connected to the second pixel electrode; and a first gate line electrically connected to the first transistor and the second transistor, wherein in the first pixel electrode, a first length along the first direction is shorter than a second length along a second direction perpendicular to the first direction, and the first pixel electrode includes at least one slit, and the slit extends at an angle of less than or equal to 45 degrees with respect to the second direction.

7 Claims, 7 Drawing Sheets

(56) References Cited

U.S. PATENT DOCUMENTS

2017/0097547 A1* 4/2017 Huh .................. G02F 1/133377
2017/0285419 A1   10/2017 Kajita et al.
2017/0322462 A1* 11/2017 Lee .................... G02F 1/13394

* cited by examiner

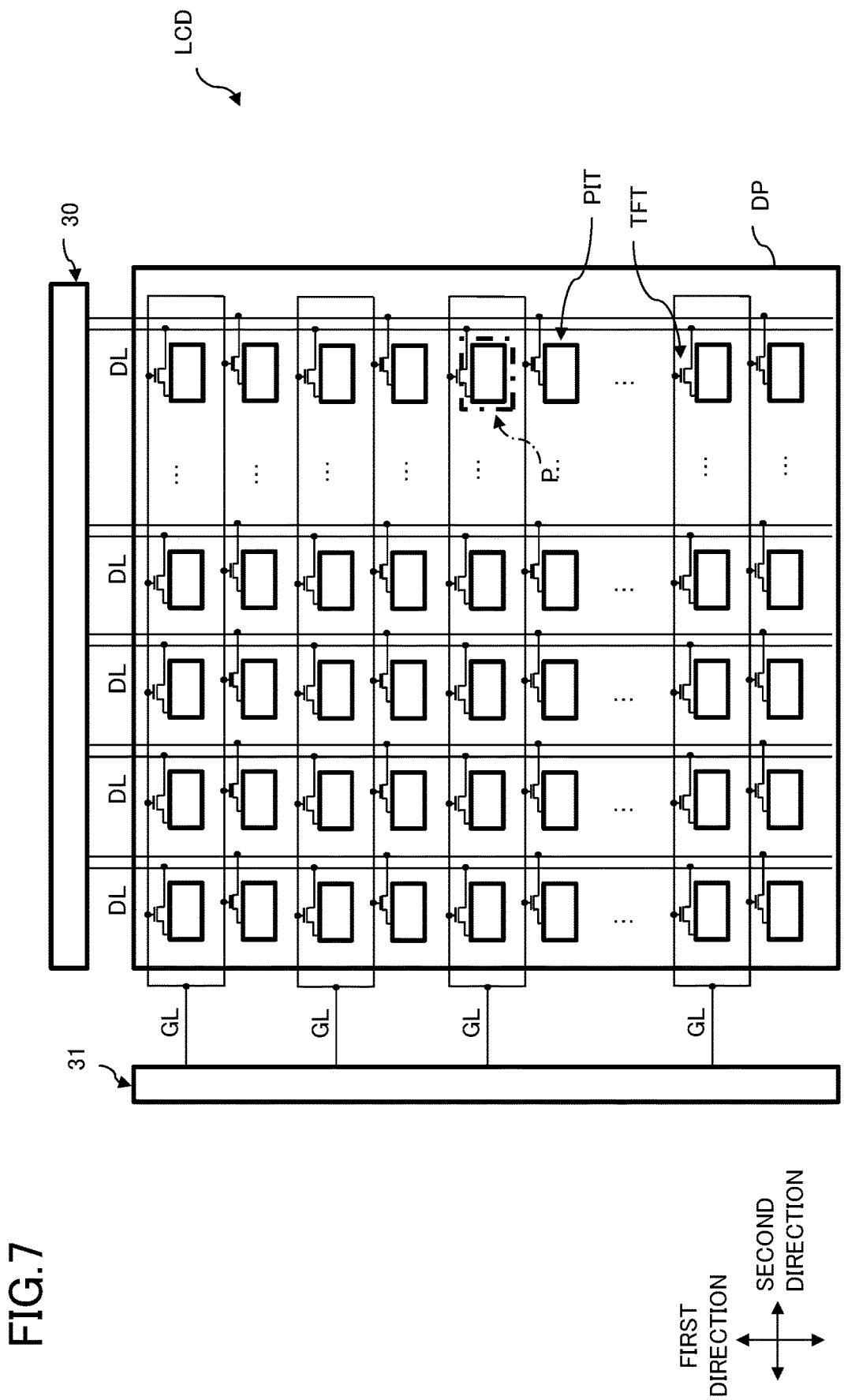

LIQUID CRYSTAL DISPLAY DEVICE

CROSS-REFERENCE TO RELATED APPLICATION

This application claims priority from Japanese application JP 2018-030565, filed Feb. 23, 2018. This Japanese application is incorporated herein by reference.

BACKGROUND

1. Technical Field

The present disclosure relates to a liquid crystal display device.

2. Description of the Related Art

In various liquid crystal display devices, a lateral electric field system liquid crystal display device has an advantage of an excellent wide viewing angle characteristic. For example, the lateral electric field system liquid crystal display device includes a pixel electrode and a common electrode in one of a pair of substrates, which are disposed opposite each other with a liquid crystal layer interposed between the pair of substrates. An electric field (lateral electric field) in a direction parallel to a substrate surface is generated between the pixel electrode and the common electrode, and the lateral electric field is applied to liquid crystal to drive the liquid crystal, whereby an amount of light transmitted through the liquid crystal layer is controlled to display an image. Examples of the lateral electric field system include an IPS (In-Plane Switching) system and an FFS (Fringe Field Switching) system.

For example, in the lateral electric field system liquid crystal display device of Unexamined Japanese Patent Publication No. 2008-180928, a pixel electrode having a long side along a source line to which a data signal is transmitted and a short side orthogonal to the source line is used, and a plurality of slits are provided in the pixel electrode. The slit extends in a short-side direction.

SUMMARY

In the above configuration, there is a problem in that an aperture ratio is low. That is, in the conventional configuration, an electric field is hardly applied to liquid crystal disposed at an end of the slit, and transmittance at the end of the slit is decreased. Because the end of the slit is disposed in a long-side region of the pixel electrode, the aperture ratio of the pixel is decreased as a whole.

The present disclosure has been made in view of the above problem, and an object of the present disclosure is to improve the aperture ratio in the lateral electric field system liquid crystal display device.

To solve the above problem, a liquid crystal display device according to a present disclosure comprises: a first data line extending in a first direction; a first pixel electrode and a second pixel electrode that are arranged in the first direction; a first transistor connected to the first pixel electrode; a second transistor connected to the second pixel electrode; and a first gate line electrically connected to the first transistor and the second transistor, wherein in the first pixel electrode, a first length along the first direction is shorter than a second length along a second direction perpendicular to the first direction, and the first pixel electrode includes at least one slit, and the slit extends at an angle of less than or equal to 45 degrees with respect to the second direction.

The liquid crystal display device according to the present disclosure can improve the aperture ratio in the lateral electric field system liquid crystal display device.

BRIEF DESCRIPTION OF DRAWINGS

FIG. 7 is a plan view illustrating a schematic configuration of liquid crystal display device according to the third exemplary embodiment.

DETAILED DESCRIPTION

First Exemplary Embodiment

A first exemplary embodiment of the present disclosure will be described below with reference to the drawings.

Figure 1:
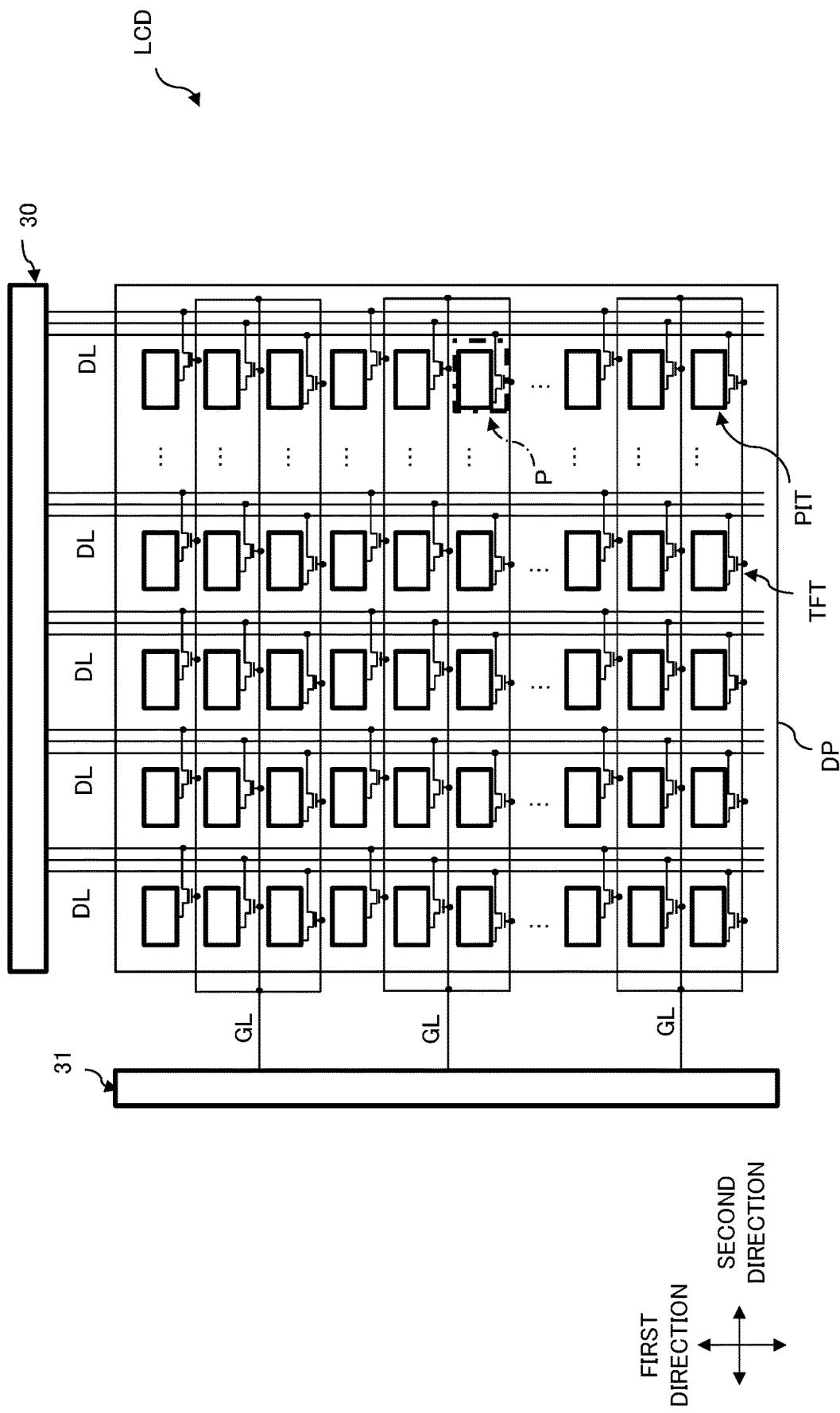
FIG. 1 is a plan view illustrating a schematic configuration of a liquid crystal display device according to a first exemplary embodiment.

FIG. 1 is a plan view illustrating an overall configuration of liquid crystal display device LCD according to the first exemplary embodiment of the present disclosure. Liquid crystal display device LCD includes display panel DP that displays an image, a display panel drive circuit (data line drive circuit 30, gate line drive circuit 31) that drives display panel DP, a control circuit (not illustrated) that controls the display panel drive circuit, and a backlight (not illustrated) that irradiates display panel DP with backlight light from a rear surface side.

Figure 2:
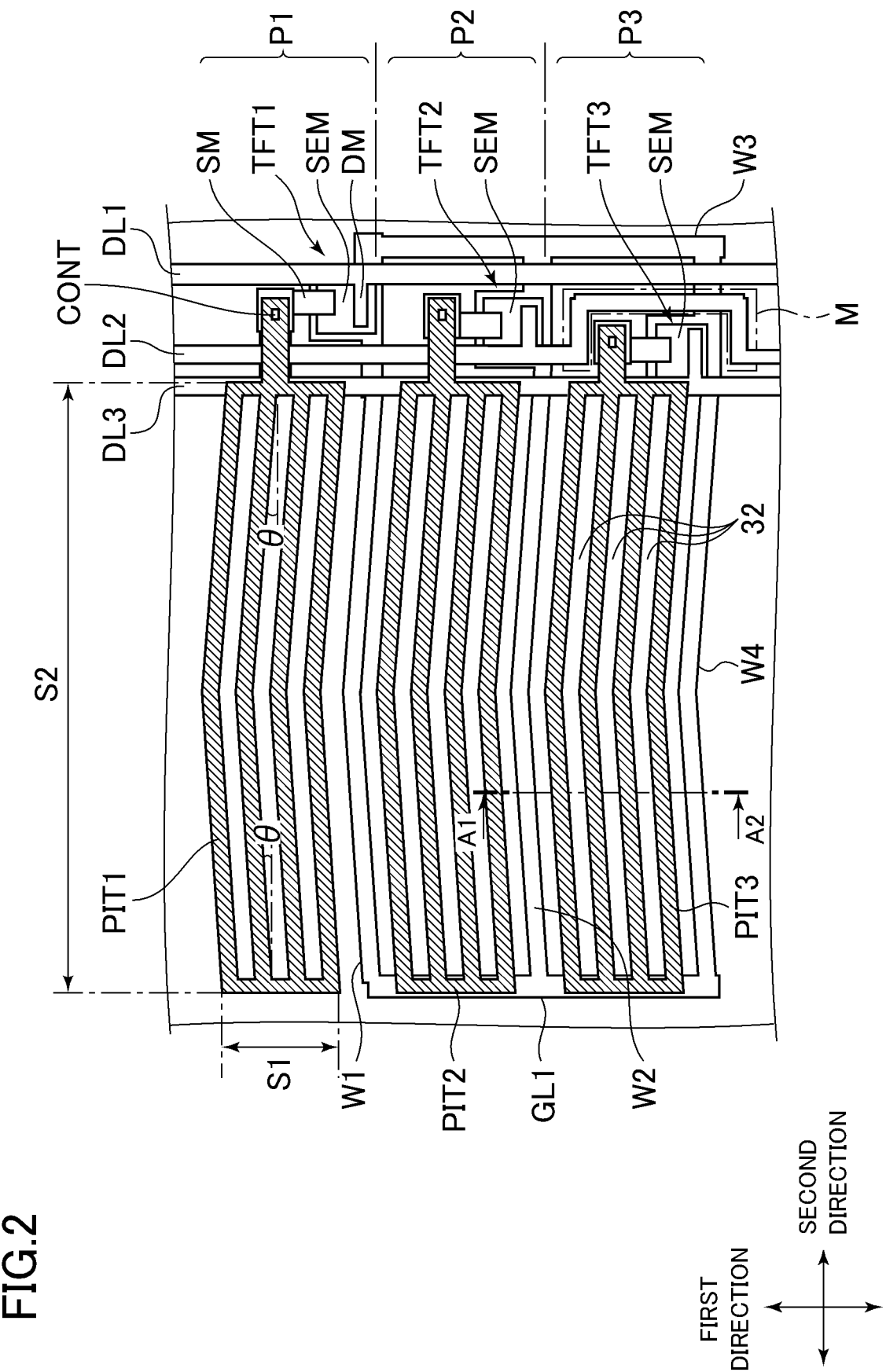
FIG. 2 is a plan view illustrating a configuration of a part of display panel according to the first exemplary embodiment.
Figure 3:
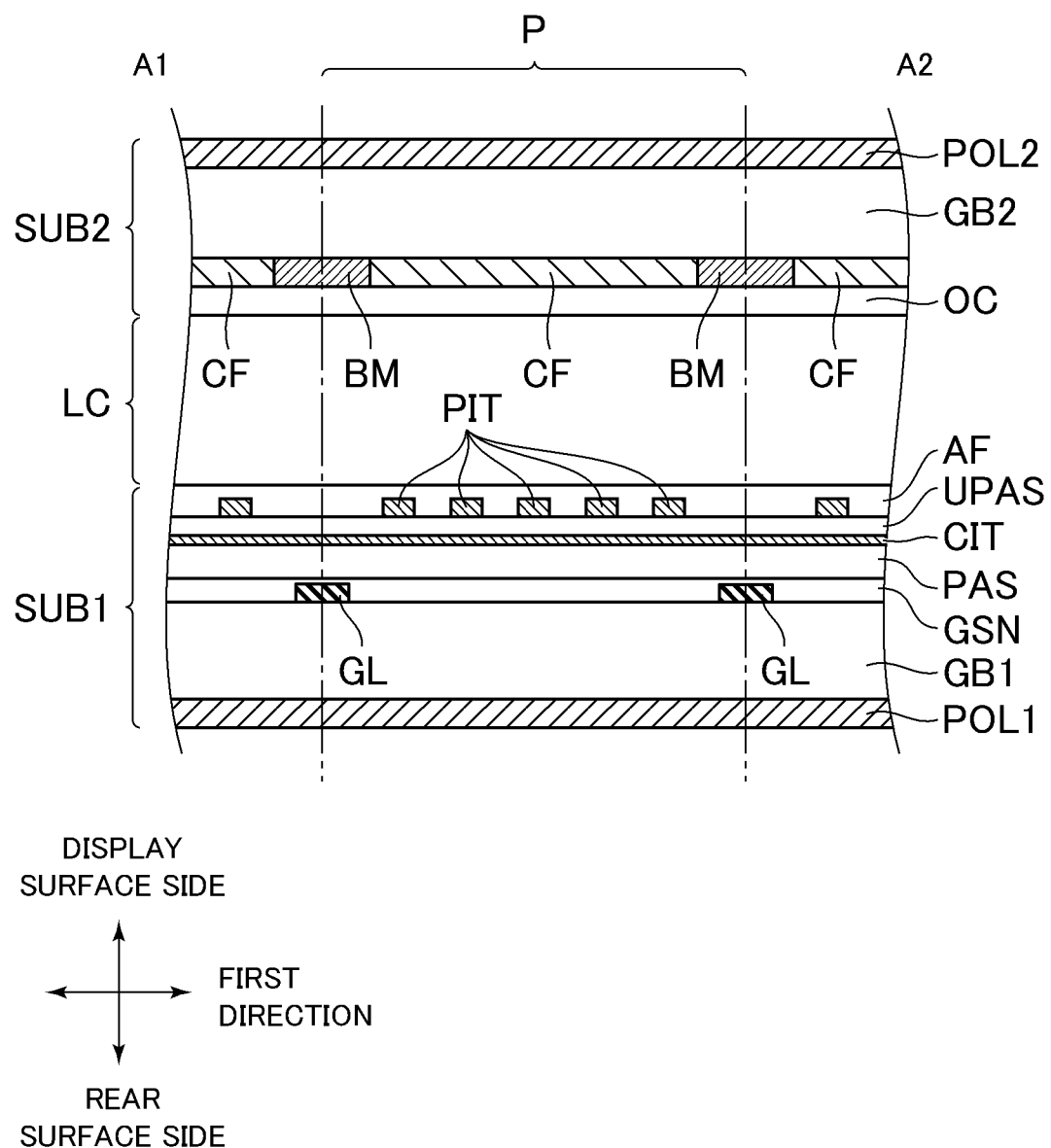
FIG. 3 is an end face view of a cut portion taken along line A1-A2 in FIG. 2.

FIG. 2 is a plan view illustrating a configuration of a part of display panel DP of the first exemplary embodiment. FIG. 3 is an end face view of a cut portion taken along line A1-A2 in FIG. 2. Three pixels P are illustrated in FIG. 2, and one pixel P is illustrated in FIG. 3.

Display panel DP includes thin film transistor substrate SUB1 (hereinafter, referred to as TFT substrate SUB1) disposed on the rear surface side, color filter substrate SUB2 (hereinafter, referred to as CF substrate SUB2) that is disposed on a display surface side while opposed to TFT substrate SUB1, and liquid crystal layer LC sandwiched between TFT substrate SUB1 and CF substrate SUB2.

In the first exemplary embodiment, first data line DL1, second data line DL2, and third data line DL3, which extend in the first direction, are formed in TFT substrate SUB1. Second data line DL2 is disposed between first data line DL1 and third data line DL3. First pixel electrode PIT1, second pixel electrode PIT2, and third pixel electrode PIT3 are arranged in the first direction. First transistor TFT1 is connected to first pixel electrode PIT1, second transistor TFT2 is connected to second pixel electrode PIT2, and third transistor TFT3 is connected to third pixel electrode PIT3. A blue portion of color filter CF (to be described later) is superimposed on first pixel P1 on which first pixel electrode PIT1 is disposed in planar view, a green portion of color filter CF is superimposed on second pixel P2 on which second pixel electrode PIT2 is disposed in planar view, and a red portion of color filter CF is superimposed on third pixel P3 on which third pixel electrode PIT3 is disposed in planar view.

In first pixel electrode PIT1, second pixel electrode PIT2, and third pixel electrode PIT3, first length S1 along the first direction is shorter than second length S2 along a second direction perpendicular to the first direction. Each of first pixel electrode PIT1, second pixel electrode PIT2, and third pixel electrode PIT3 includes slit 32, and slit 32 extends at an angle of 7 degrees with respect to the second direction. The extending direction of slit 32 is not limited to the angle of 7 degrees. That is, acute angle θ within an intersecting angle between the extending direction of slit 32 and the second direction ranges from 0 degree to 45 degrees inclusive, and preferably acute angle θ ranges from 7 degrees to 15 degrees inclusive.

In the first exemplary embodiment, first gate line GL1 is formed on TFT substrate SUB1. First gate line GL1 includes first wiring W1 connected to first transistor TFT1, second wiring W2 connected to second transistor TFT2, and third wiring W3 connecting first wiring W1 and second wiring W2. First wiring W1 extends between first pixel electrode PIT1 and second pixel electrode PIT2, second wiring W2 extends between second pixel electrode PIT2 and third pixel electrode PIT3, and third wiring W3 extends in the first direction. In this way, one first gate GL1 includes the wiring extending in the first direction and the wiring extending in the direction intersecting the first direction, and electrically connects first transistor TFT1 and second transistor TFT2.

In the first exemplary embodiment, first gate line GL1 further includes fourth wiring W4 extending in the second direction, and fourth wiring W4 is connected to third transistor TFT3. Fourth wiring W4 is connected to third wiring W3. Fourth wiring W4 is disposed between third pixel electrode PIT3 and another pixel electrode PIT (not illustrated) disposed adjacent to third pixel electrode PIT3 in the first direction.

In the first exemplary embodiment, first gate line GL1 includes a plurality of wirings (first wiring W1, second wiring W2, and fourth wiring W4) extending in the direction intersecting the first direction, and each wiring is disposed between the plurality of pixel electrodes PIT arranged in the first direction, respectively. However, one wiring extending in the second direction may be configured as long as first gate line GL1 connects first transistor TFT1 and second transistor TFT2. However, the plurality of wirings extending in the direction intersecting the first direction are desirably provided to decrease a resistance value in each wiring.

In the first exemplary embodiment, first data line DL1, second data line DL2, and third data line DL3, which extend in the first direction, are connected to different transistors. Specifically, first data line DL1 is connected to first transistor TFT1, second data line DL2 is connected to second transistor TFT2, and third data line DL3 is connected to third transistor TFT3.

In the first exemplary embodiment, as illustrated in FIG. 2, second data line DL2 includes a meandering part M that circumvents third transistor TFT3. Because second data line DL2 includes meandering part M, an area of a region where first data line DL1 and second data line DL2 are disposed can be reduced, and an aperture ratio of whole display panel DP can be increased.

In liquid crystal display device LCD, a first pixel electrode array including first pixel electrode PIT1, second pixel electrode PIT2, and third pixel electrode PIT3 in FIG. 2 may further include a plurality of pixel electrodes arranged in the first direction. Liquid crystal display device LCD may further include a second pixel electrode array including the plurality of pixel electrodes arranged in the first direction, and disposed adjacent to the first pixel electrode array in the second direction. In this case, first data line DL1, second data line DL2, and third data line DL3 are disposed between the first pixel electrode array and the second pixel electrode array.

Pixel electrode PIT can be formed using a light-transmitting conductive film such as tin-doped indium oxide (ITO). In each transistor TFT (first transistor TFT1, second transistor TFT2, and third transistor TFT3), semiconductor layer SEM made of amorphous silicon (a-Si) in FIG. 2 is formed on gate insulator GSN in FIG. 3, and drain electrode DM and source electrode SM are formed on semiconductor layer SEM. Drain electrode DM is electrically connected to data line DL. Source electrode SM and pixel electrode PIT are electrically connected to each other through contact hole CONT.

A laminated structure of portions constituting each pixel P (first pixel P1, second pixel P2, and third pixel P3) is not limited to the configuration in FIG. 3, but a known configuration can be applied. For example, in the configuration of FIG. 3, in TFT substrate SUB1, gate line GL (see FIG. 2) is formed on first glass substrate GB1 (first translucent substrate), and gate insulator GSN is formed so as to cover gate line GL. Data line DL is formed on gate insulator GSN, and insulating film PAS is formed so as to cover data line DL. Common electrode CIT (display electrode) is formed on insulating film PAS, and an upper insulating film UPAS is formed so as to cover common electrode CIT. Further, pixel electrode PIT is formed on upper insulating film UPAS, and alignment film AF is formed so as to cover pixel electrode PIT. First polarizing plate POL1 is formed on the rear surface side of first glass substrate GB1.

In CF substrate SUB2 of FIG. 3, black matrix BM (light blocking portion) and color filter CF (for example, a red portion, a green portion, and a blue portion) (light transmission part) are formed on a lower surface side of second glass substrate GB2 (second translucent substrate), and overcoat layer OC is formed so as to cover black matrix BM and color filter CF. Second polarizing plate POL2 is formed on the display surface side of second glass substrate GB2. Thus, second glass substrate GB2 is located on the display surface side while opposed to first glass substrate GB1, and liquid crystal layer LC is located between first glass substrate GB1 and second glass substrate GB2. Liquid crystal layer LC includes liquid crystal molecules 301 (positive liquid crystal) having positive dielectric anisotropy. Liquid crystal molecules 301 are aligned such that a long-axis direction of liquid crystal molecule 301 is matched with the second direction.

In the above example, the IPS system is cited as an example of the lateral electric field system, but the present disclosure is not limited to the IPS system. The laminated structure of each portions constituting pixel P is not limited to the above configuration. For example, pixel electrode PIT and common electrode CIT may have a comb-tooth shape, and be disposed in the same layer.

A method for driving liquid crystal display device LCD will briefly be described below. A scanning gate voltage output from gate line drive circuit 31 is supplied to gate line GL, and a video data voltage output from data line drive circuit 30 is supplied to data line DL. When a gate-on voltage is supplied to gate line GL, semiconductor layer SEM of thin film transistor TFT becomes low resistance, and the data voltage supplied to data line DL is supplied to pixel electrode PIT through source electrode SM. A common voltage output from a common electrode drive circuit (not illustrated) is supplied to common electrode CIT. Consequently, an electric field (driving electric field) is generated between pixel electrode PIT and common electrode CIT, and liquid crystal layer LC is driven by the electric field to display an image.

With this configuration, improvement of the aperture ratio can be achieved. Each pixel electrode PIT has a configuration in which the first length along the first direction is shorter than the second length along the second direction perpendicular to the first direction. That is, each pixel electrode PIT has a shape in which the second direction becomes a longitudinal direction. The extending direction of slit 32 provided in each pixel electrode PIT is set to be an angle direction of less than or equal to 45 degrees with respect to the second direction that is the longitudinal direction, and an end of slit 32, which is difficult to apply the electric field, is not arranged in the longitudinal direction of pixel electrode PIT. In the first exemplary embodiment, the end of slit 32 is disposed so as to follow the first direction. As a result, the aperture ratio of one pixel P can be improved.

Liquid crystal layer LC includes liquid crystal molecules 301 (positive liquid crystal) having the positive dielectric anisotropy, and the long-axis direction of the liquid crystal molecule 301 is matched with the second direction, so that contrast from a field of view in the second direction can be improved. For example, it is assumed that liquid crystal display device LCD of the present disclosure is used as a display in a car navigation device such that the first direction becomes a vertical direction while the second direction becomes the transverse direction. In this case, because the car navigation device is typically disposed between a driver's seat and a passenger's seat, desirably the contrast from the field of view in the transverse direction is high. The long-axis direction of the liquid crystal molecule 301 is aligned in the transverse direction, so that this requirement can be satisfied. Additionally, because the positive liquid crystal is used as liquid crystal molecule 301, liquid crystal display device LCD can be used in a wide temperature range, and liquid crystal display device LCD is also suitable for an in-vehicle display.

In the case where liquid crystal display device LCD of the present disclosure is disposed such that the first direction becomes the vertical direction while the second direction becomes the transverse direction, because each data line DL extends in the vertical direction, a conventionally-used general image IC (integrated circuit) can be used, and it is not necessary to separately use a special image IC that rotates the image by 90 degrees.

That is, the configuration of the first exemplary embodiment can achieve liquid crystal display device LCD, in which use of special image IC is not required, the positive liquid crystal used in a wide temperature range can be used, the contrast from the field of view in the transverse direction is high, and the aperture ratio is high.

Second Exemplary Embodiment

A second exemplary embodiment will be described below with reference to the drawings. The description of the same configuration as that of the first exemplary embodiment will be omitted.

Figure 4:
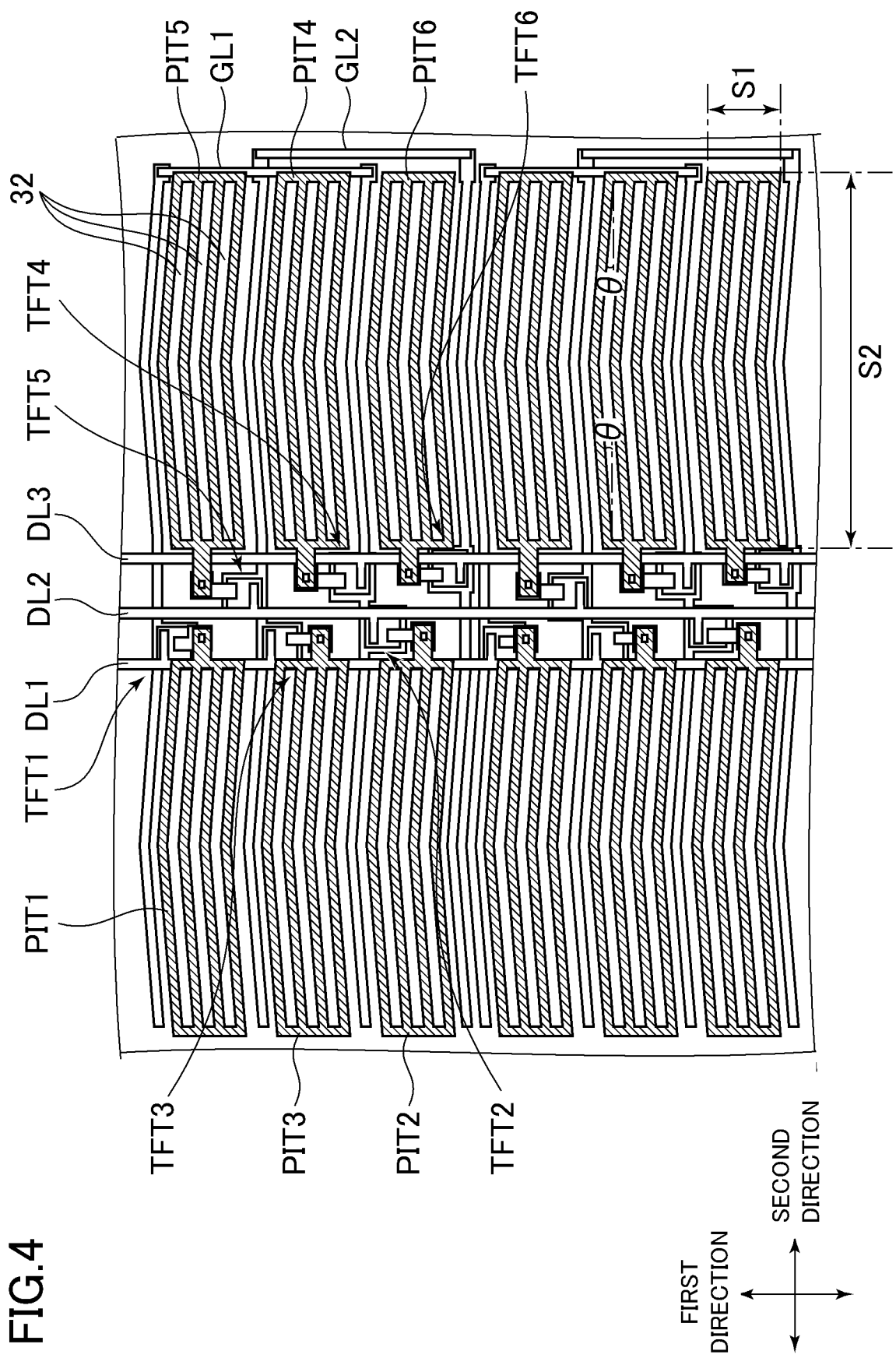
FIG. 4 is a plan view illustrating a configuration of a part of display panel according to a second exemplary embodiment.
Figure 5:
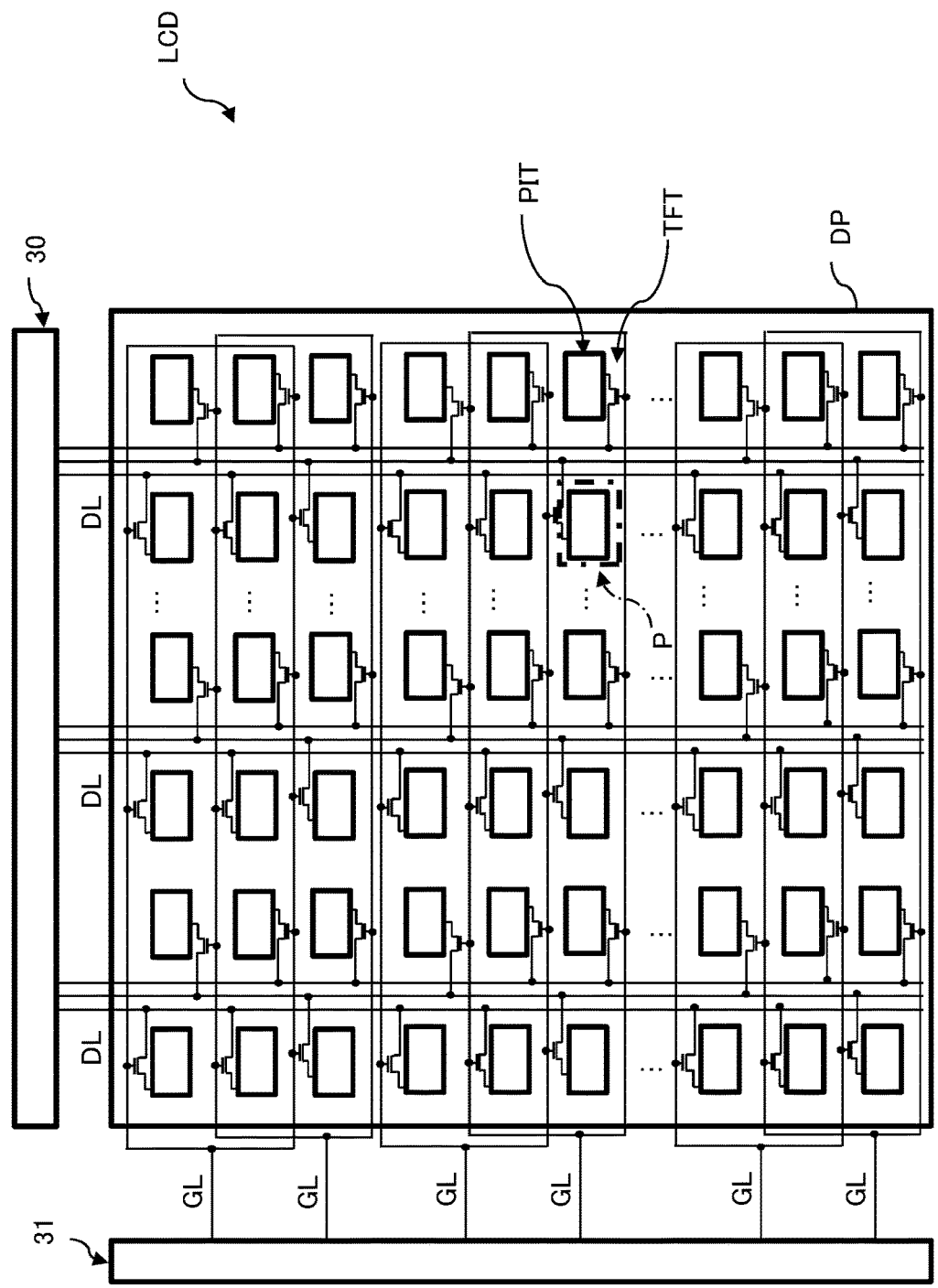
FIG. 5 is a plan view illustrating a schematic configuration of liquid crystal display device according to the second exemplary embodiment.

FIG. 4 is a plan view illustrating a configuration of a part of display panel DP of the second exemplary embodiment. FIG. 5 is a plan view illustrating a schematic configuration of liquid crystal display device LCD of the second exemplary embodiment.

As illustrated in FIGS. 4 and 5, in the second exemplary embodiment, first data line DL1, second data line DL2, and third data line DL3, which extend in the first direction are formed in TFT substrate SUB1. Second data line DL2 is disposed between first data line DL1 and third data line DL3. First pixel electrode PIT1, second pixel electrode PIT2, and third pixel electrode PIT3 are arranged in the first direction, and third pixel electrode PIT3 is disposed between first pixel electrode PIT1 and second pixel electrode PIT2. That is, third pixel electrode PIT3 is adjacent to first pixel electrode PIT1 and second pixel electrode PIT2. Fourth pixel electrode PIT4 disposed adjacent to third pixel electrode PIT3 in the second direction, fifth pixel electrode PIT5 disposed adjacent to first pixel electrode PIT1 in the second direction, and sixth pixel electrode PIT6 disposed adjacent to second pixel electrode PIT2 in the second direction are formed. That is, fourth pixel electrode PIT4 is disposed between fifth pixel electrode PIT5 and sixth pixel electrode PIT6, and fourth pixel electrode PIT4 is adjacent to fifth pixel electrode PIT5 and sixth pixel electrode PIT6.

First transistor TFT1 is connected to first pixel electrode PIT1, second transistor TFT2 is connected to second pixel electrode PIT2, and third transistor TFT3 is connected to third pixel electrode PIT3. Fourth transistor TFT4 is connected to fourth pixel electrode PIT4, fifth transistor TFT5 is connected to fifth pixel electrode PIT5, and sixth transistor TFT6 is connected to sixth pixel electrode PIT6.

In the second exemplary embodiment, the red portion of color filter CF is superimposed on first pixel electrode PIT1 and fifth pixel electrode PIT5 in planar view, the blue portion of color filter CF is superimposed on second pixel electrode PIT2 and sixth pixel electrode PIT6 in planar view, and the green portion of color filter CF is superimposed on third pixel electrode PIT3 and fourth pixel electrode PIT4 in planar view.

In each pixel electrode PIT (first pixel electrode PIT1, second pixel electrode PIT2, third pixel electrode PIT3, fourth pixel electrode PIT4, fifth pixel electrode PIT5, and sixth pixel electrode PIT6), as described above with reference to FIG. 2 in the first exemplary embodiment, first length S1 along the first direction is shorter than second length S2 along the second direction perpendicular to the first direction. Each pixel electrode PIT includes slit 32, and slit 32 extends at the angle of 7 degrees with respect to the second direction. The extending direction of slit 32 is not limited to the angle of 7 degrees. That is, acute angle θ within an intersecting angle between the extending direction of slit 32 and the second direction ranges from 0 degree to 45 degrees inclusive, and preferably acute angle θ ranges from 7 degrees to 15 degrees inclusive.

In the second exemplary embodiment, first gate line GL1 formed on TFT substrate SUB1 is connected to first transistor TFT1, second transistor TFT2, and fourth transistor TFT4. Second gate line GL2 is connected to third transistor TFT3, fifth transistor TFT5, and sixth transistor TFT6.

In the second exemplary embodiment, first transistor TFT1 and fifth transistor TFT5 are disposed between first pixel electrode PIT1 and fifth pixel electrode PIT5. Similarly, second transistor TFT2 and sixth transistor TFT6 are disposed between second pixel electrode PIT2 and sixth pixel electrode PIT6, and third transistor TFT3 and fourth transistor TFT4 are disposed between third pixel electrode PIT3 and fourth pixel electrode PIT4.

In the second exemplary embodiment, second data line DL2 disposed between first data line DL1 and third data line DL3 is electrically connected to one of first transistor TFT1, second transistor TFT2, and third transistors TFT3, and electrically connected to one of fourth transistor TFT4, fifth transistor TFT5, and sixth transistor TFT6. First data line DL1 is connected to two of first transistor TFT1, second transistor TFT2, and third transistor TFT3, which are not connected to second data line DL2. Third data line DL3 is connected to two of fourth transistor TFT4, fifth transistor TFT5, and sixth transistor TFT6, which are not connected to second data line DL2.

In the example of FIG. 4, first data line DL1 is connected to first transistor TFT1 and third transistor TFT3. Second data line DL2 is connected to second transistor TFT2 and fifth transistor TFT5. Third data line DL3 is connected to fourth transistor TFT4 and sixth transistor TFT6. First data line DL1, second data line DL2, and third data line DL3 are linearly disposed, and six pixel electrodes PIT are intensively disposed in a space between the three data lines DL.

With this configuration, the following effects can be obtained in addition to the effects of the first exemplary embodiment.

Using three data lines DL, an image data signal is written in six transistor TFTs (first transistor TFT1, second transistor TFT2, third transistor TFT3, fourth transistor TFT4, fifth transistor TFT5, and sixth transistor TFT6) connected to six pixel electrodes PIT disposed on both sides of three data lines DL, so that a number of data lines DL can be decreased to half as compared with the first exemplary embodiment. As a result, the number of comparatively expensive data line drive circuits 30 can be decreased to achieve cost reduction.

Six pixel electrodes PIT can intensively be disposed by taking advantage of the space between three data lines DL, so that three data lines DL can linearly be disposed while the high aperture ratio of display panel DP is maintained as a whole. As a result, the meandering part M of the first exemplary embodiment need not to be provided, therefore a parasitic capacitance between data line DL and a shield electrode can easily be aligned among pixels P.

Third Exemplary Embodiment

A third exemplary embodiment will be described below with reference to the drawings. The description of the same configuration as those of the first and second exemplary embodiments will be omitted.

Figure 6:
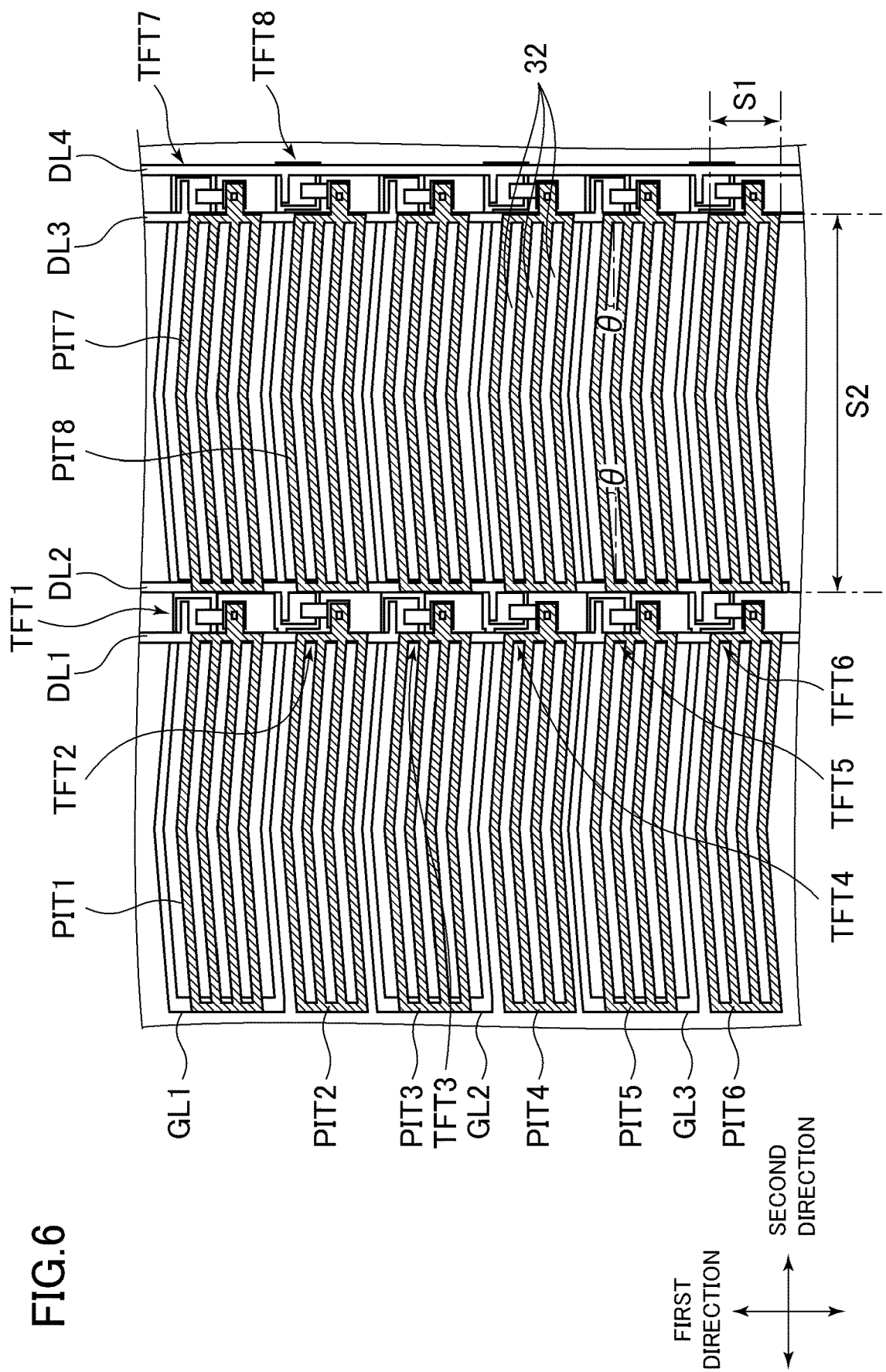
FIG. 6 is a plan view illustrating a configuration of a part of display panel according to a third exemplary embodiment.

FIG. 6 is a plan view illustrating a configuration of a part of display panel DP of the third exemplary embodiment. FIG. 7 is a plan view illustrating a schematic configuration of liquid crystal display device LCD of the third exemplary embodiment.

As illustrated in FIGS. 6 and 7, in the third exemplary embodiment, first data line DL1 and second data line DL2, which extend in the first direction, are formed in TFT substrate SUB1. First pixel electrode PIT1, second pixel electrode PIT2, third pixel electrode PIT3, fourth pixel electrode PIT4, fifth pixel electrode PIT5, and sixth pixel electrode PIT6 are sequentially arranged in the first direction. That is, second pixel electrode PIT2 is disposed between first pixel electrode PIT1 and third pixel electrode PIT3, and is adjacent to first pixel electrode PIT1 and third pixel electrode PIT3. Third pixel electrode PIT3 is disposed between second pixel electrode PIT2 and fourth pixel electrode PIT4, and is adjacent to second pixel electrode PIT2 and fourth pixel electrode PIT4. Fourth pixel electrode PIT4 is disposed between third pixel electrode PIT3 and fifth pixel electrode PIT5, and is adjacent to third pixel electrode PIT3 and fifth pixel electrode PIT5. Fifth pixel electrode PIT5 is disposed between fourth pixel electrode PIT4 and sixth pixel electrode PIT6, and is adjacent to fourth pixel electrode PIT4 and sixth pixel electrode PIT6.

First transistor TFT1 is connected to first pixel electrode PIT1, second transistor TFT2 is connected to second pixel electrode PIT2, and third transistor TFT3 is connected to third pixel electrode PIT3. Fourth transistor TFT4 is connected to fourth pixel electrode PIT4, fifth transistor TFT5 is connected to fifth pixel electrode PIT5, and sixth transistor TFT6 is connected to sixth pixel electrode PIT6.

In the third exemplary embodiment, the red portion of color filter CF is superimposed on first pixel electrode PIT1 and fourth pixel electrode PIT4 in planar view, the green portion of color filter CF is superimposed on second pixel electrode PIT2 and fifth pixel electrode PIT5 in planar view, and the blue portion of color filter CF is superimposed on third pixel electrode PIT3 and sixth pixel electrode PIT6 in planar view.

In each pixel electrode PIT (first pixel electrode PIT1, second pixel electrode PIT2, third pixel electrode PIT3, fourth pixel electrode PIT4, fifth pixel electrode PIT5, and sixth pixel electrode PIT6), as described above with reference to FIG. 2 in the first exemplary embodiment, first length S1 along the first direction is shorter than second length S2 along the second direction perpendicular to the first direction. Each pixel electrode PIT includes slit 32, and slit 32 extends at the angle of 7 degrees with respect to the second direction. The extending direction of slit 32 is not limited to the angle of 7 degrees. That is, acute angle θ within an intersecting angle between the extending direction of slit 32 and the second direction ranges from 0 degree to 45 degrees inclusive, and preferably acute angle θ ranges from 7 degrees to 15 degrees inclusive.

In the third exemplary embodiment, first gate line GL1 formed on TFT substrate SUB1 is connected to first transistor TFT1 and second transistor TFT2. Second gate line GL2 is connected to third transistor TFT3 and fourth transistor TFT4. Third gate line GL3 is connected to fifth transistor TFT5 and sixth transistor TFT6.

First gate line GL1 connected to first transistor TFT1 and second transistor TFT2 extends in the second direction as illustrated in FIG. 6. Seventh pixel electrode PIT7 disposed adjacent to first pixel electrode PIT1 in the second direction is connected to seventh transistor TFT7, and eighth pixel electrode PIT8 disposed adjacent to second pixel electrode PIT2 in the second direction is connected to eighth transistor TFT8. Seventh transistor TFT7 and eighth transistor TFT8 are connected to first gate line GL1 extending in the second direction from first transistor TFT1 and second transistor TFT2. Second gate line GL2 and third gate line GL3 extend in the second direction, and are connected to transistors TFT of pixel electrodes PIT arranged in the second direction.

First data line DL1 is connected to first transistor TFT1, third transistor TFT3, and fifth transistor TFT5, and second data line DL2 is connected to second transistor TFT2, fourth transistor TFT4, and sixth transistor TFT6. Seventh transistor TFT7 and eighth transistor TFT8 are connected to data line DL different from first data line DL1 and second data line DL2, seventh transistor TFT7 is connected to third data line DL3, and eighth transistor TFT8 is connected to fourth data line DL4.

In liquid crystal display device LCD, the first pixel electrode array in FIG. 6 including first pixel electrode PIT1, second pixel electrode PIT2, third pixel electrode PIT3, fourth pixel electrode PIT4, fifth pixel electrode PIT5, and six pixel electrode PIT6 may further include a plurality of pixel electrodes arranged in the first direction. In liquid crystal display device LCD, the second pixel electrode array including seventh pixel electrode PIT7 and eighth pixel electrode PIT8 in FIG. 6 may further include a plurality of pixel electrodes arranged in the first direction. The second pixel electrode array is disposed adjacent to the first pixel electrode array in the second direction. In this case, first data line DL1 and second data line DL2 are disposed between the first pixel electrode array and the second pixel electrode array.

Liquid crystal display device LCD may further include a plurality of pixel electrodes arranged in the first direction and a third pixel electrode array disposed adjacent to the first pixel electrode array in the second direction. The first pixel electrode array may be disposed between the third pixel electrode array and the second pixel electrode array. In this case, first data line DL1 may be disposed between the first pixel electrode array and the second pixel electrode array, and second data line DL2 may be disposed between first pixel electrode array and the third pixel electrode array.

With this configuration, the following effects can be obtained in addition to the effects of the first exemplary embodiment.

Using only two data lines DL (first data line DL1 and second data line DL2), the image data is written in three transistors TFT (first transistor TFT1, second transistor TFT2, and third transistor TFT3) connected to three pixel electrodes PIT (first pixel electrode PIT1, second pixel electrode PIT2, and third pixel electrode PIT3), so that the number of data lines DL can be decreased to two thirds as compared with the first exemplary embodiment. As a result, the number of comparatively expensive data line drive circuits 30 can be decreased to achieve the cost reduction.

The number of data lines DL is not excessively decreased as compared with the second exemplary embodiment, so that the third exemplary embodiment can cope with the case where high resolution is required. That is, in the configuration of the second exemplary embodiment, the number of data lines DL becomes half while the number of gate lines GL needs to be doubled as compared with the configuration of the first exemplary embodiment. As a result, it is necessary to write image data in each transistor TFT at a double speed. On the other hand, in the configuration of the third exemplary embodiment, the number of data lines DL is decreased to two thirds while the number of gate lines GL needs to be increased by 1.5 times as compared with the configuration of the first exemplary embodiment. As a result, it is sufficient to write the image data in each transistor TFT at a 1.5-times speed. Consequently, the configuration of the third exemplary embodiment can cope with the case where the high resolution is required.

In the third exemplary embodiment, as illustrated in FIG. 3, pixel electrode PIT disposed close to the side of liquid crystal layer LC with respect to common electrode CIT is illustrated by way of example. However, the present disclosure is not limited to the third exemplary embodiment. That is, common electrode CIT may be disposed close to the side of liquid crystal layer LC with respect to pixel electrode PIT.

In this case, slit 32 is not formed in pixel electrode PIT. Alternatively, the slit is formed in common electrode CIT. A shape of the slit formed in common electrode CIT is superimposed on slit 32 formed in pixel electrode PIT of the third exemplary embodiment in planar view.

In the above, the specific embodiments of the present application have been described, but the present application is not limited to the above-mentioned embodiments, and various modifications may be made as appropriate without departing from the spirit of the present application.

What is claimed is:

1. A liquid crystal display device comprising:
   a first data line extending in a first direction;
   a second data line extending in the first direction;
   a third data line extending in the first direction;
   a first pixel electrode and a second pixel electrode that are arranged in the first direction;
   a third pixel electrode disposed with the first pixel electrode and the second pixel electrode in the first direction;
   a first transistor connected to the first pixel electrode;
   a second transistor connected to the second pixel electrode;
   a third transistor connected to the third pixel electrode, and
   a first gate line electrically connected to the first transistor, the second transistor and the third transistor,
   wherein the second pixel electrode is disposed adjacent to the first pixel electrode and the third pixel electrode,
   the first data line is connected to the first transistor,
   the second data line is connected to the second transistor,
   the third data line is connected to the third transistor, in the first pixel electrode, a first length along the first direction is shorter than a second length along a second direction perpendicular to the first direction,
   the first pixel electrode includes at least one slit, and the slit extends at an angle of less than or equal to 45 degrees with respect to the second direction, and
   the second data line includes a meandering part that circumvents the third transistor.

2. The liquid crystal display device according to claim 1, wherein
   the first gate line includes:
   a first wiring that extends between the first pixel electrode and the second pixel electrode and is connected to the first transistor;
   a second wiring that extends between the third pixel electrode and the second pixel electrode and is connected to the second transistor; and
   a third wiring connecting the first wiring and the second wiring.

3. The liquid crystal display device according to claim 1, wherein
   the first pixel electrode is superimposed on a color filter having a first color in planar view,
   the second pixel electrode is superimposed on a color filter having a second color in planar view,
   the third pixel electrode is superimposed on a color filter having a third color in planar view, and
   the first color, the second color, and the third color are different from one another.

4. The liquid crystal display device according to claim 1, further comprising:
   a first pixel electrode array in which a plurality of pixel electrodes including the first pixel electrode, the second pixel electrode, and the third pixel electrode are arranged in the first direction; and a second pixel electrode array that includes a plurality of pixel electrodes arranged in the first direction and is disposed adjacent to the first pixel electrode array in the second direction, wherein the first data line, the second data line, and the third data line are disposed between the first pixel electrode array and the second pixel electrode array.

5. The liquid crystal display device according to claim 4, wherein the second data line is disposed between the first data line and the third data line.

6. The liquid crystal display device according to claim 1, further comprising a liquid crystal layer, wherein the liquid crystal layer includes a liquid crystal molecule having positive dielectric anisotropy.

7. The liquid crystal display device according to claim 6, wherein a long-axis direction of the liquid crystal molecule is aligned in the second direction.

* * * * *